Aug. 27, 1963 M. V. SCOZZAFAVA ETAL 3,101,896
CALCUATING MACHINE
Filed Oct. 30, 1961 6 Sheets-Sheet 3
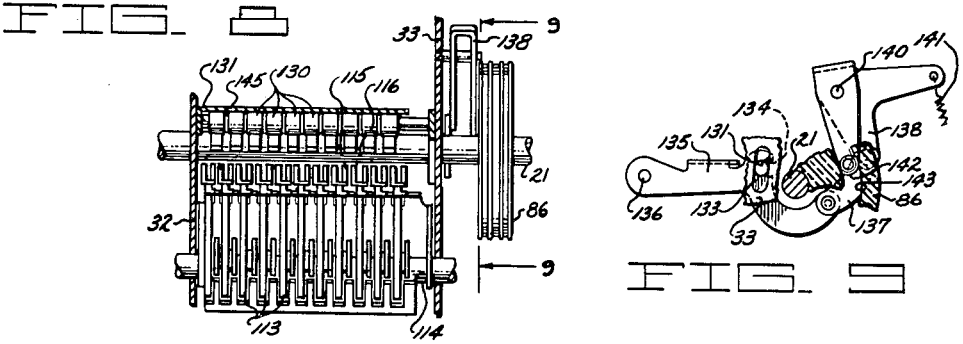
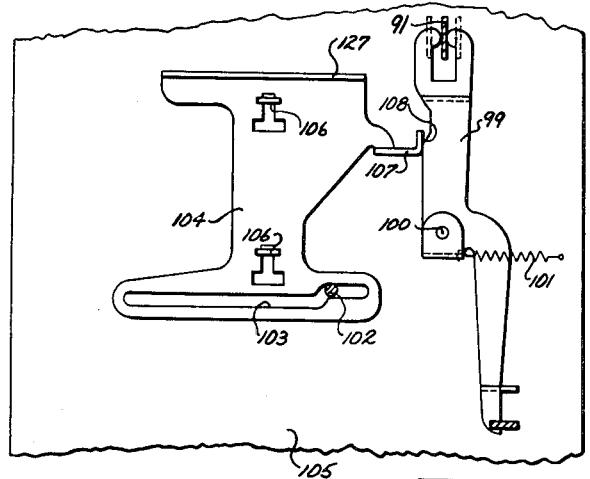
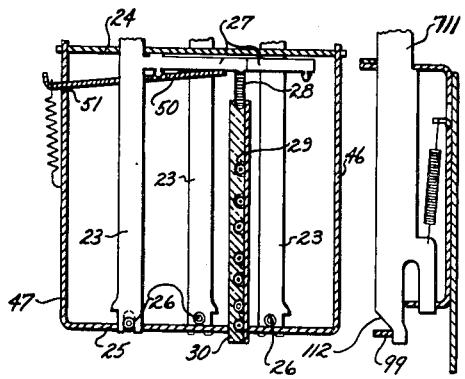
INVENTOR.
MILTON V. SCOZZAFAVA
RICHARD E. BUSCH
BY
ATTORNEY

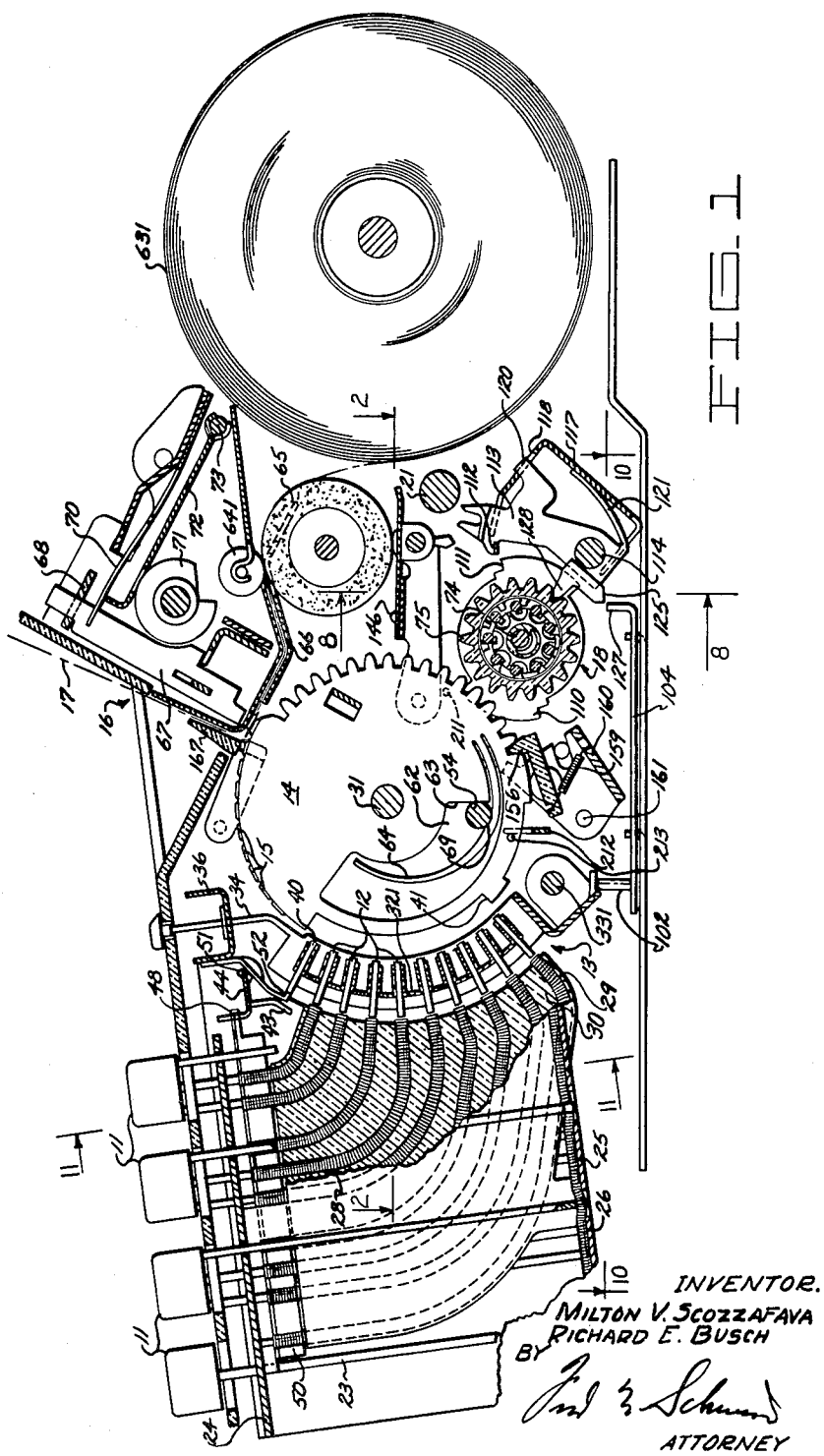

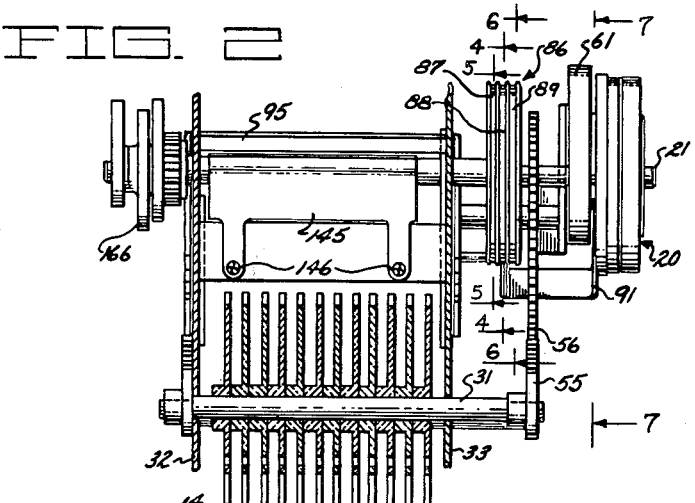
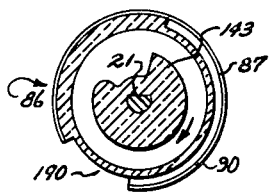
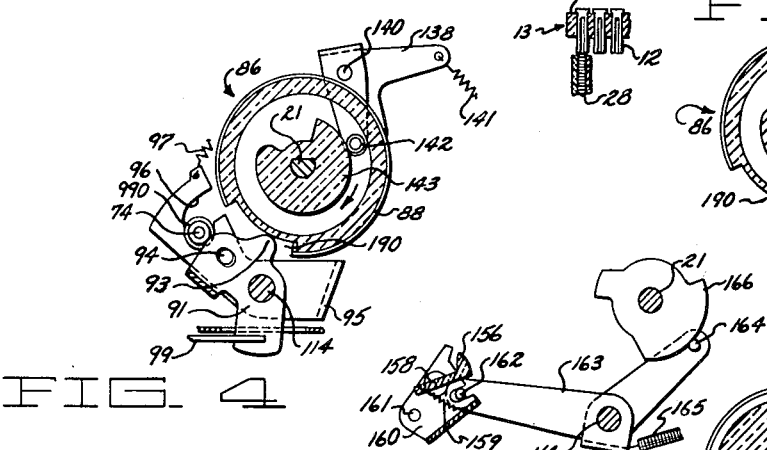
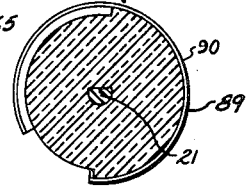
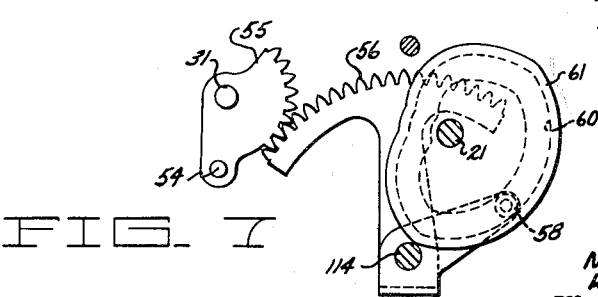

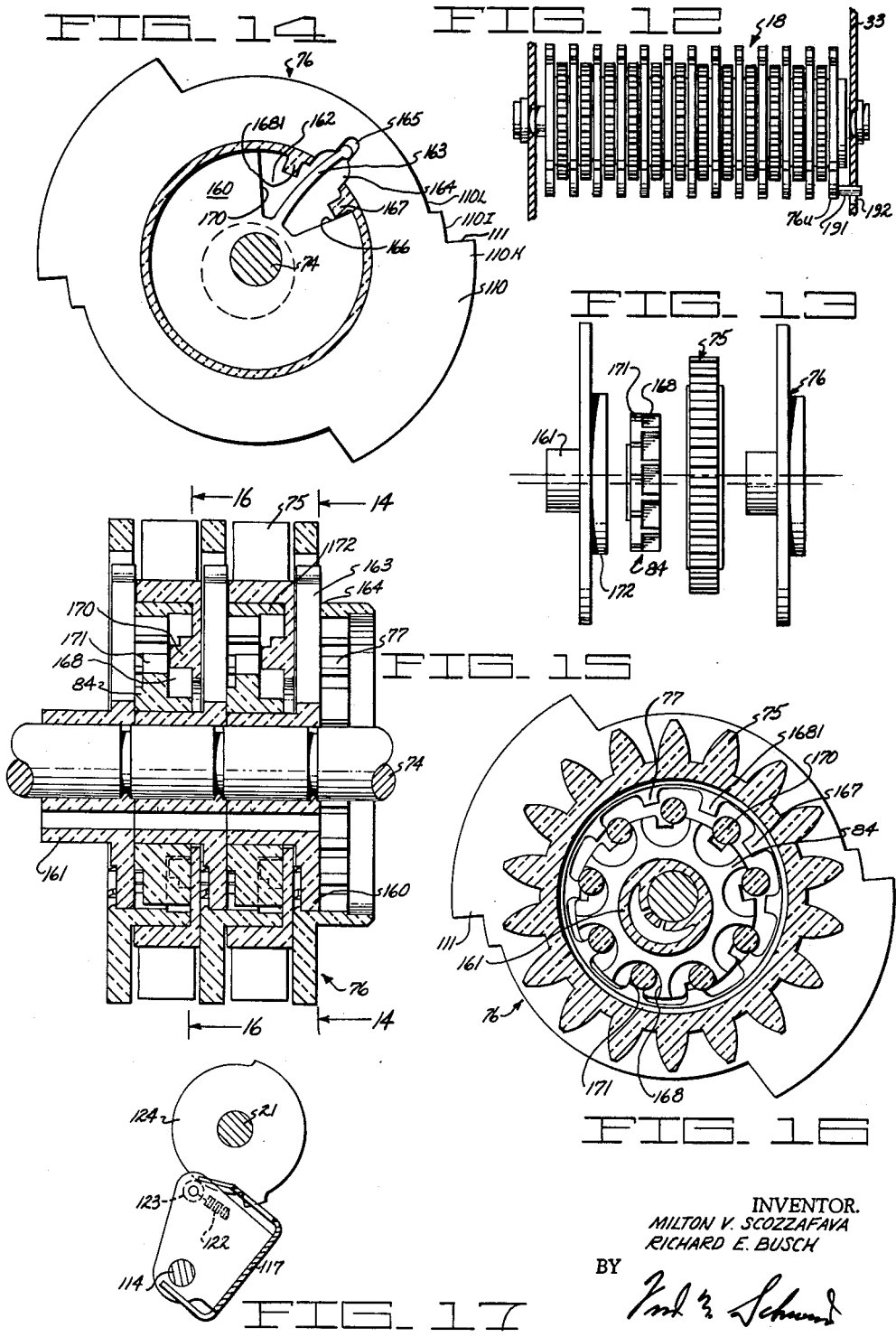

Aug. 27, 1963    M. V. SCOZZAFAVA ETAL    3,101,896
CALCUATING MACHINE
Filed Oct. 30, 1961    6 Sheets-Sheet 5
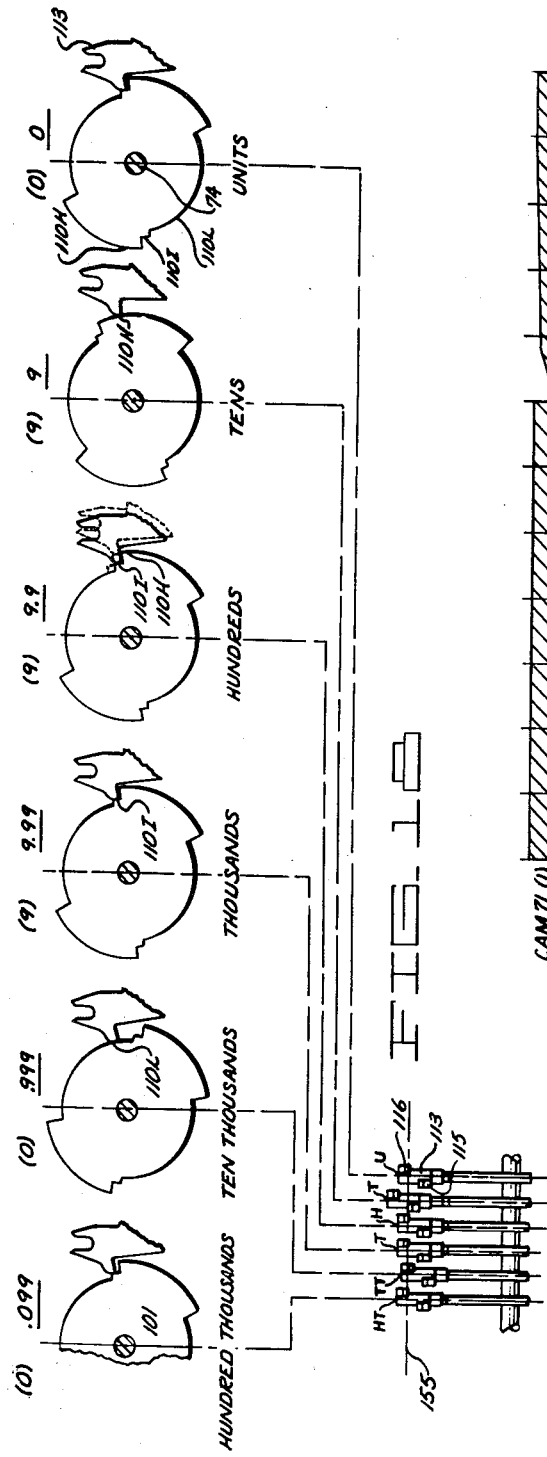
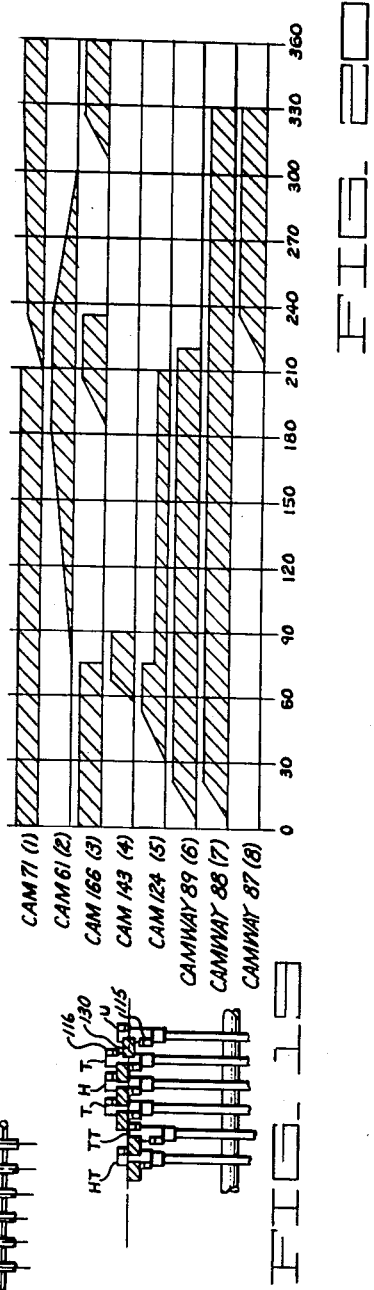
INVENTOR.
MILTON V. SCOZZAFAVA
RICHARD E. BUSCH
BY
ATTORNEY

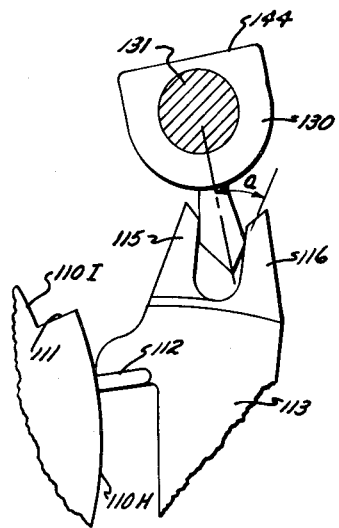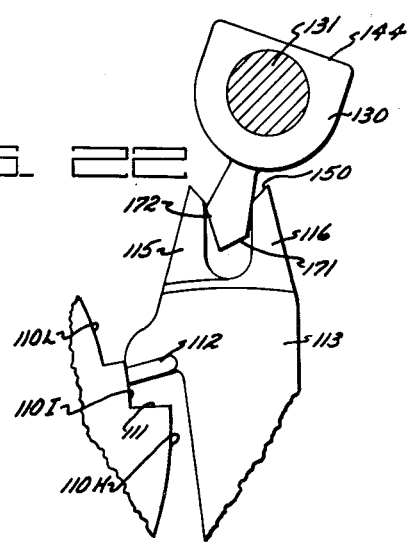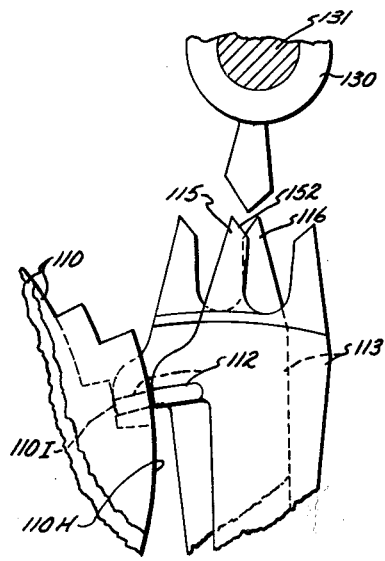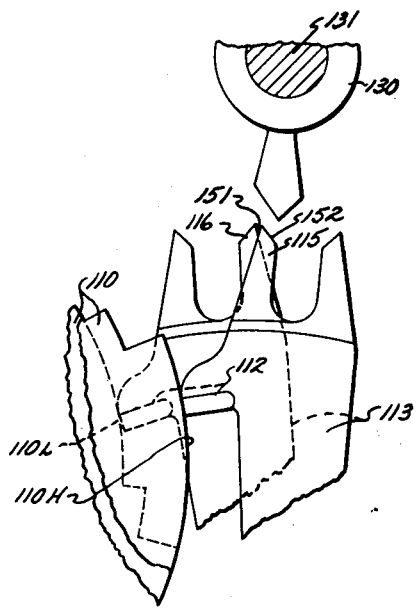

United States Patent Office

3,101,896
Patented Aug. 27, 1963

3,101,896
CALCULATING MACHINE
Milton V. Scozzafava, Arcadia, and Richard E. Busch,
La Puente, Calif., assignors to Clary Corporation, San
Gabriel, Calif., a corporation of California
Filed Oct. 30, 1961, Ser. No. 148,625
5 Claims. (Cl. 235—136)

This invention relates to calculating machines and has particular reference to accumulators of the crawl type wherein each denominational order includes a register gear which is driven through a differential mechanism jointly by a digitizing gear located in the same denominational order and by the register gear in the next lower order.

Such accumulators in themselves are relatively simple and reliable because of the direct geared relation between the various denominationally arranged register gears. However, heretofore totaling and subtotaling of crawl type accumulators have presented problems. These have arisen because the register gear in each order receives a fractional entry of one-tenth (in decimal accumulators) the movement of the next lower order register gear so that it is possible for a register gear to register, say, 9.99. Now, in totaling and subtotaling, the gears are driven in a subtractive direction until zero stop shoulders on or associated with the register gears engage total stops. Thus, in the case of the register gear which registers 9.99, it would have to be retracted beyond nine increments in order to effect a proper total. However, since, at the registration of 9.99, the associated zero stop would be practically at 0, the total stop would, under normal circumstances, block retraction of such register gear and an erroneous total or subtotal would result.

The above problem has been solved by the invention disclosed and claimed in the copending application of R. E. Busch, Serial No. 130,078, filed August 8, 1961, by controlling the positioning of the total stops during totaling and subtotaling operations in accordance with the values registered in the accumulator.

The mechanism of the above application works satisfactorily and is superior to prior mechanisms for effecting totaling and subtotaling of crawl type accumulators of the foregoing type. However, when utilizing inexpensive parts having relatively large tolerances or inaccuracies in dimensions, it has been found that frictional drag or binding forces may be set up in the entrained gearing or bearings which could cause malfunctioning during totaling and subtotaling.

It therefore becomes a principal object of the present invention to overcome the above noted difficulties in a crawl type accumulator of the above type.

Another object is to prevent drag or binding forces set up in a crawl type accumulator of the above type from interfering with proper totaling and/or subtotaling of the accumulator.

Another object is to provide a simple and reliable accumulator whose parts may have relatively large dimensional tolerances.

The manner in which the above and other objects of the invention are accomplished will be readily understood on reference to the following specification when read in conjunction with the accompanying drawings, wherein:

FIG. 1 is a longitudinal sectional view of an adding machine embodying a preferred form of the present invention.

FIG. 2 is a sectional plan view taken substantially along the line 2—2 of FIG. 1.

FIG. 3 is a sectional view of the aligner operating mechanism.

FIG. 4 is a sectional view taken along the line 4—4 of FIG. 2 illustrating the accumulator control cam and associated cam follower.

FIG. 5 is a sectional view through the accumulator control cam and is taken along the line 5—5 of FIG. 2.

FIG. 6 is another sectional view through the accumulator control cam and is taken along the line 6—6 of FIG. 2.

FIG. 7 is a sectional side view of the main sector drive mechanism and is taken substantially along the line 7—7 of FIG. 2.

FIG. 8 is a sectional view illustrating part of the total taking mechanism of the accumulator and is taken substantially along the line 8—8 of FIG. 1.

FIG. 9 is a side view of the mechanism for actuating the total stop sensing wedges, and is taken substantially along the line 9—9 of FIG. 8.

FIG. 10 is a sectional plan view taken substantially along the line 10—10 of FIG. 1 illustrating part of the accumulator controls.

FIG. 11 is a transverse sectional view through the keyboard and is taken along the line 11—11 of FIG. 1.

FIG. 12 is a plan view of the accumulator.

FIG. 13 is an enlarged exploded view illustrating the parts comprising one denominational order of the accumulator.

FIG. 14 is an enlarged sectional view through the accumulator and is taken substantially along the line 14—14 of FIG. 15.

FIG. 15 is an enlarged sectional view through the accumulator and is taken along the line 15—15 of FIG. 14.

FIG. 16 is a view similar to FIG. 14 but is taken along the line 16—16 of FIG. 15.

FIG. 17 is a side view of the total stop mechanism.

FIG. 18 is a diagrammatic view illustrating the relationship of the accumulator parts and total stop levers when registering an exemplary value.

FIG. 19 is a diagrammatic view illustrating the relationship of the total stop levers and total stop sensing wedges upon lowering of the latter into cooperative relation with the levers.

FIG. 20 illustrates a timing chart of the machine.

FIG. 21 is an enlarged fragmentary view illustrating a total stop and sensing wedge in a position sensing a register gear element positioned to register the digital value 9.

FIG. 22 is a view similar to FIG. 21 but illustrating a total stop lever and sensing wedge in a position sensing a register gear element set to register 0.

FIG. 23 is an enlarged fragmentary view illustrating the relative positions of two adjacent total stop levers when sensing respective register gear elements set to register the true value 99, prior to lowering of the sensing wedges.

FIG. 24 is a view similar to FIG. 23, illustrating the register gear elements set to register the true value 09, prior to lowering of the sensing wedges.

*General Design*

Referring to the drawings, the machine is of the 10-key type wherein the digits of a value are entered sequentially through ten amount keys, certain of which are indicated at 11 (FIGS. 1 and 11), which keys range in value from 0 to 9. Operation of the machine to perform entry and total or subtotal functions is controlled by two depressible control bars, one of which is partially shown at 711 (FIG. 11).

Depression of an amount key sets an appropriate stop pin 12 (FIGS. 1 and 2) in a pin carriage generally indicated at 13 which shifts laterally of the machine into cooperative relation with printing sectors 14. Each of the latter carries a series of type characters 15 on its periphery, ranging from 0 to 9, the character 0 being located at the clockwisemost location relative to the rest of the series.

The printing sectors cooperate with a printing mechanism generally indicated at 16 to print amounts registered by the sectors 14 onto a paper strip 17. The sectors also cooperate with an accumulator generally indicated at 18 to enter amounts therein or to remove accumulated amounts during totaling and subtotaling operations.

The machine is driven by an electric motor (not shown) through a cyclically operable clutch generally indicated at 20 (FIG. 2). Upon depression of either control bar, means (not shown) is actuated to cause engagement of the clutch to drive a main shaft 21 one complete revolution. The shaft carries various cams to be described hereinafter for driving different operating units of the machine in proper timed relation.

Keyboard

The amount keys 11 are mounted on key stem 23 (FIGS. 1 and 11) slideable vertically in slots provided in upper and lower key frame plates 24 and 25, respectively, the frames being suitably secured to the framework of the machine. Tension springs 26 attached at their ends to the lower frame plate 25 extend under the key stems to normally hold the amount keys in raised condition. Such springs extend across openings in the plate 25 to permit depression of the keys.

Each key stem has an extension, i.e., 27, which is attached to the upper end of a respective flexible cable 28. The various cables are vertically aligned with each other and are slideably mounted for endwise movement in grooves 29 formed in a guideblock 30 attached to the lower plate 25. The various cables terminate in an arcuate pattern concentric with a shaft 31 which is rotatably mounted in bearings formed in side frame plates 32 and 33 (FIG. 2) forming part of the machine framework.

Pin Carriage

The pin carriage 13 is formed of an arcuate body 321 slideably mounted at its lower end on a stationary rod 331. The pin carriage has an extension 34 at its upper end which is guided along a slot formed in a channel member 36 extending across the machine framework.

The pin carriage has a plurality of vertical columns of stop pins 12, as indicated partly in FIG. 2, which pins extend radially of the shaft 31 and are slideable endwise in grooves formed in the carriage body. The stop pins are located in horizontal rows aligned with the lower ends of the flexible cables 28. Thus, upon depression of a selected amount key 11, the respective cable 28 will be moved endwise to likewise move an aligned stop pin from its normal ineffective position shown in FIG. 1 to a position wherein it forms an abutment in the path of a shoulder 41 formed on each of the printing sectors 14. The pins 12 are constructed to frictionally engage the sides of their respective grooves and thereby remain in their endwise adjusted positions until returned in the latter stages of the machine cycle as an incident to return of the pin carriage.

An additional horizontally extending row of escapement stop pins 40 are provided above the remaining pins 12. Such pins are aligned with the vertical columns of pins 12 and are likewise slideably mounted in grooves formed in the pin carriage body 321 for endwise movement by a finger 43 of a bail 44. The bail is pivotally supported at 51 and is pivotally connected at 48 to a bail 50 (FIG. 11) which is fulcrumed in a slot 51 in the frame plate 47 and underlies the extensions 27 of all the amount keys. Thus, upon depression of any amount key to set an appropriate stop pin 12, the bail 50 is rocked, causing the finger 43 on the bail 44 to depress an aligned escapement pin 40 whereby the pin carriage may escape one column to the left under the action of a suitable spring (not shown).

Upon depression of the amount key representing the nines digit, only the pin 40 which allows the pin carriage to escape will be depressed. In this case, the appropriate sector will be yieldably driven nine increments, whereupon it will be arrested by engagement of a pin 211 thereon against a stationary rack comb 212 which extends transversely across the machine.

Printing Sector Drive

The various printing sectors 14 are independently and rotatably mounted on the shaft 31 and are yieldably driven clockwise from their home positions illustrated in FIG. 1 by a bail rod 54. The latter is mounted at its ends on gear sectors, one of which is shown at 55 (FIG. 7). Sector 55 meshes with a gear sector 56 pivoted on a shaft 114 and carrying a follower roller 58 which engages a cam groove 60 formed in a cam 61 suitably attached to the drive shaft 21.

The bail rod 54 extends through openings 62 in the various printing sectors 14 and is normally engaged by a shoulder 69 formed on a tail 64 extending integrally with each sector.

As seen in FIG. 20 (item 2), the bail rod 54 is rocked clockwise from its illustrated home position from approximately 75° to 180° of the cycle. During this period, it will correspondingly rotate the sectors until they strike a depressed stop pin 12 in the pin carriage or until a pin 211 thereon strikes the comb plate 212 during digit entry operations or until an associated accumulator gear is returned to 0 during totaling and subtotaling operations as will be described later. Thereupon detenting shoulders 69 on the tail 64 will yield, permitting the bail rod to proceed to the limit of its excursion.

From approximately 220° to 300°, the bail rod will be returned counterclockwise to its home position. During this period, the frictional engagement between the bail rod and the tails 64 will normally first drive the sectors 14 to their home positions which, in each case, are controlled by pins 213 integrally formed on the sectors coming to rest against the comb 212. The arresting of the sectors by pins 213 will allow the rod 54, as it continues homeward, to slide along the tail 64, coming to rest behind the detenting or driving shoulder 69.

Printer and Paper Feed

The paper strip 17 is fed from a supply roll 631 between gripping feed rollers 641 and 65 and through a guideway 66, past a printing station located between the printing sectors 14 and respective hammers 67. From the printing station, the strip is passed upwardly behind a transparent tearoff bar 167.

The hammers 67 are suitably guided in a frame 68 for endwise movement radially of the sectors 14, toward and away from contact with the paper strip 17. Spring elements 70 urge the hammers downwardly but are normally restrained by a rotatable cam element 71 which operates through a follower bail 72 pivoted at 73.

The cam 71 is suitably entrained through gearing not shown with the shaft 21 and during the printing phase (FIG. 20, item 1) which occurs at approximately 170° in the machine cycle, the cam permits the spring 70 to impel the hammers 67 downwardly, thus causing an imprint of selected type characters 15 onto the strip through a suitable printing ribbon (not shown).

Accumulator

In accordance with the present invention, the accumulator 18 is of the entocyclic crawl carry type. Referring in particular to FIGS. 1 and 12 through 16, the accumulator comprises an accumulator shaft 74 guided for movement toward and away from the sectors 14 by suitable guide means (not shown) so as to permit meshing and demeshing of digitizing gears 75, forming part of the accumulator, with respective gear tooth sections on the printing sectors 14. The gears 75 are preferably formed of molded plastic material.

Each denominational order of the accumulator comprises a register gear element 76, preferably of molded plastic material, having a set of ten internal teeth 77. The element 76 is rotatably mounted on a bearing flange 160 of an eccentric bearing 161, also preferably of a flexible molded plastic material, which, in turn, is rotatably mounted on the shaft 74. The flange 160 has a cutout portion 162 from the bottom of which integrally extends a yieldable spring finger 163. The latter projects through an opening 164 in the element 76 and fits within a socket 165 in a flange 110 of the element 76.

During item entry operations and normally during totaling and subtotaling operations, the spring finger 163 maintains an edge 166 of the flange 160 against a tooth 167 of the element 76. However, during totaling and subtotaling operations, and in accordance with the present invention, should frictional drag exist which will prevent the eccentric bearing 161 from being turned by its associated gear element 76, the finger 163 may yield by an amount up to one angular increment. This will be clarified later on. Relative movement of the element 76 beyond one increment is prevented by a second tooth 1681 which is engageable by an opposite edge 170 of the flange 160. Although this yield can result in an error of one-tenth of an increment in the higher order digitizing gear 75, such inaccuracy is insufficient to cause an inaccurate setting of the printing sectors during such totaling and subtotaling operations since an aligner 156 (FIG. 1), to be described later, becomes effective to correct any inaccuracies due to accumulated clearances, etc., in the positioning of the sectors 14 when the latter are located beyond their intended positions in one direction or another up to one-half of an increment. For this purpose, the spring fingers 163 are so constructed that they will yield before the detenting shoulders 69 of the sectors yield to the advancing movement of the bail rod 54. However, the fingers 163 are stiff enough to resist yielding during item entry operations since, under these conditions, the entrained gearing presents a ten-to-one mechanical advantage, and resistance to rotation is minimal under these conditions since the register gears are free to assume any condition.

A floating gear 84, also preferably of plastic, having nine semi-circular tooth formations 168 formed on the right-hand side thereof (FIG. 15) is rotatably mounted on each eccentric bearing 161. Such tooth formations mesh with nine equally spaced pins 170 projecting integrally from the side of the adjacent gear 75 to prevent relative rotation between such gears 75 and 84. Each gear 84, further, has a set of nine tooth formations 171 which mesh with the ten teeth 77 formed on the gear element 76 in the same denominational order.

It should be noted that each digitizing gear 75 is rotatably mounted concentrically of the shaft 74 on an annular flange 172 projecting to the right of the associated gear element 76. Each gear 75 carries a set of eighteen external teeth thereon arranged to mesh with the gear tooth section of the associated printing sector 14.

From the above, it will be seen that each register gear 76 receives an equal incremental advance from its associated digitizing gear 75 and a one-tenth incremental advance from the register gear 76 in the next lower denominational order. Thus, a tens carry is effected simultaneously with digitation in either of opposite directions, depending on whether additive or subtractive entries are being made.

Referring to FIG. 12, it will be noted that the register gear 76u in the lowermost or units denominational order is prevented from rotating in either direction and, for this purpose, it is provided with a pin 191 which is embraced by a slot 192 in a frame plate 33. The slot 192 preferably extends in a direction radially of the printing sectors 14 so as to prevent rotation of the gear 76u during meshing and demeshing of the accumulator relative to the printing sectors.

*Accumulator Controls*

The accumulator is meshed and demeshed with the printing sectors 14 at different times in the machine cycle as set forth by items 6, 7 and 8 in the timing diagram of FIG. 20, depending on whether additive or subtractive entries are being made or whether totaling or subtotaling operations are being performed. For this purpose, an accumulator control cam 86 (FIGS. 2, 4, 5 and 6) is attached to the main shaft 21. The cam 86 is provided with three different camways 87, 88 and 89 on its periphery, the camways being separated by broken flanges 90.

A cam follower bail 91 is mounted on a stationary shaft 114 for both pivotal and longitudinal movement along the shaft. A follower nose 93 on the bail may be positioned to follow a selected camway. The bail is connected through a pin and slot connection 94 with a camming bail 95 which is also pivoted on the shaft 114 but suitably prevented from moving therealong. Bail 95 is provided with spaced arms having cam grooves 96 therein which embrace rollers 999 on the opposite ends of the accumulator shaft 74. Accordingly, when the bails 91 and 95 are rocked counterclockwise by a selected camway, against the action of a tension spring 97, they will cam the accumulator into mesh with the printing sectors.

It will be noted that the flanges are broken at 190 to permit lateral shifting of the follower bail 91 when the machine is in full cycle position.

Means are provided to shift the follower bail 91 into cooperative relation with any of the camways on cam 86. For this purpose, the bail is engaged by a bifurcated lever 99 (FIG. 10) pivoted at 100 and urged counterclockwise by a tension spring 101 tending to locate the nose of the cam follower bail 91 in engagement with the camway 87 of the control cam 86. In such case, the accumulator would be meshed with the printing sectors 14 during the return or counterclockwise rocking movements thereof as occurs during additive entry operations (see item 8, FIG. 20).

Now, the pin carriage carries a stud 102 (FIGS. 1 and 10) which is embraced within a slot 103 formed in a blocking plate 104. The latter is slideably mounted for fore and aft movement on a bottom frame plate 105 of the machine through pin and slot connections 106. When the pin carriage is moved into its right-hand or home position, the stud 102 cams the blocking plate 104 forwardly into its position shown in FIG. 10, causing an ear 107 thereon to cam against an inclined edge 108 on the lever 99, thus moving the latter into its neutral illustrated position wherein the cam follower bail 91 is positioned in cooperative relation with the central camway 88 of cam 86. It will be noted on reference to FIGS. 4 and 20, item 7, that the camway 88 has a high portion extending around the major part of its periphery, whereby to maintain the accumulator in mesh with the printing sectors during both the advance and retraction of the latter. This occurs during subtotaling operations of the accumulator.

Thus, when no amount has been entered into the pin carriage, i.e., when the pin carriage is in its home position, and the clutch is engaged by a control element (not shown) other than the control bar 711, a subtotal operation will ensue. However, when an amount has been entered into the pin carirage, i.e., when the latter is moved out of its home position, the blocking plate 104 will be cammed rearwardly of its position shown in FIG. 10, permitting the lever 99 to rock counterclockwise, thus moving the cam follower bail 91 into cooperative relation with the camway 87 to effect an add entry operation.

The minus-total bar 711 for effecting subtractive entry and totaling operations is suitably guided for vertical movement and has a camming edge 112 (FIG. 11) engageable with the lever 99 so that depression of the bar will cam the latter lever clockwise beyond its position shown in FIG. 10 whereby to position the cam follower bail 91 in cooperative relation with the camway 89 of the cam 86. As shown in FIGS. 6 and 20, item 6, the camway 89 has a high portion so located as to mesh the accumulator with the printing sectors during the early portion of the cycle or during advance of the sectors 14 so as to effect a subtractive entry or totaling operation as will be described in detail hereinafter.

*Totaling and Subtotaling Controls*

In accordance with the present invention, means are provided to effect a total or subtotal operation of the accumulator in the same cyclic period as in digitizing operations. For this purpose, the flange 110 (FIGS. 13 to 16, 18, and 21 to 24) of each register gear 76 has a broken or stepped periphery. That is, the flange is divided into two diametrically opposed high levels 110H, two diametrically opposed intermediate levels 110I and two diametrically opposed low levels 110L. A zero stop shoulder 111 is formed between each high and intermediate level.

As described heretofore, the accumulator is arranged to be totaled in a subtractive direction and is returned to zero registration during totaling operations by yieldably driving the accumulator gears through the sectors 14 until one or the other zero stop shoulder 111 on each register gear 76 is arrested by an ear 112 on an associated total stop lever 113, the latter levers being positioned in the paths of the shoulders 111 during totaling and subtotaling operations only.

The levers 113 are independently pivoted on the shaft 114 and each has two upstanding tines 115 and 116 which are spaced from each other lengthwise of the shaft and also at right angles thereto. The levers are located within a totaling stop frame 117 which is also pivoted on the shaft 114. The latter frame has slots 118 therein which embrace tails 120 on the levers 113 to limit relative movement between the levers and the frame. The levers 113 are preferably formed of flexible plastic material and each has a thin spring projection 121 integral therewith and engaging the frame 117 whereby to normally yieldably maintain the lever in its position shown in FIG. 1 relative to the frame wherein the tail 120 engages the forward edge of the associated slot 118. The frame 117 (see also FIG. 17) is normally held in a clockwise rocked position shown by a tension spring 122 which maintains a stud 123 on the frame in engagement with a cam 124 secured to the drive shaft 21. In such position, the levers 113 are held out of cooperative relation with the flanges 110 as depicted in FIG. 1.

During each cycle, as indicated by item 5, FIG. 20, the cam 124 is effective to first move the frame 117 counterclockwise a sufficient amount to permit the total stop levers 113 (if they are otherwise permitted to do so) to also move counterclockwise an amount sufficient to sense any low levels 110L of register gears which might be opposite the ears 112 of the associated levers 113. Shortly thereafter, at 75°, the cam 124 allows spring 122 to return the frame counterclockwise a partial amount sufficient to return any stop levers 113 which may have previously sensed the low levels of the respective register gear flanges 110 back to a position indicated in FIG. 22 where the intermediate portions 110I may pass therebeneath so as to permit the zero stop shoulders 111 to limit against the ears 112. Later, at 210°, the cam 124 allows the spring 122 to fully retract the frame 117 and all levers 113 into their normal positions shown in FIG. 1.

Means are provided for retracting certain of the total stop levers 113 at the start of a digitizing operation depending on the conditions of the adjacent levers in the next lower denominational orders. For this purpose, a series of camming or sensing wedges 130 (FIGS. 1, 8 and 21 to 24) are pivotally mounted independently of each other on a rod 131 located over the tines of the levers 113. As shown in FIGS. 8 and 19, each wedge 130 extends over the tine 116 of the lever 113 in one order and over the tine 115 of the lever in the next lower order.

The rod 131 is guided at its opposite ends in vertically extending slots 133 (FIG. 9) formed in frame plates 32 and 33. The rod 131 is also embraced by slots 134 formed in the arms of a bail 135 which is pivotally supported at 136 and is connected through a link 137 to a cam follower bail 138. The latter is fulcrumed at 140 and is urged clockwise by a tensioned spring 141 to hold a roller 142 thereon in engagement with a cam formation 143 (FIGS. 4 and 5) formed on the cam 86.

As indicated by item 4 of FIG. 20, the cam 143 is effective to cause cam follower 138 to rock clockwise, thereby lowering the wedges 130 into cooperative relation with the tines 115 and 116 of the levers 113 during the period extending from 60° to 90° of the cycle.

The following is a description of the cooperative relation between the total stop levers 113, the various register gears 76 and the camming wedges 130 during total or subtotal operations. When all register gears 76 register zeros, their intermediate portions 110I will be located directly under the teeth 112 of the levers 113 as indicated in FIG. 22. In such condition, if a total were attempted, the accumulator would be first moved to mesh with the sectors 14. Thereafter, the cam 124 would become effective to rock the frame 117 counterclockwise allowing the total levers 113 to sense the intermediate portions 110I of the associated register gear. Shortly thereafter, the cam 143 will lower the wedges 130. In doing so, the wedges will merely cam along the left-hand surfaces 150 of the tines 116, causing the wedges to rock idly clockwise into positions shown in FIG. 22. Subsequently, the printing sectors will be actuated to drive the zero stop shoulders 111 against the ears 112. Since no appreciable movement of the register gears will take place at this time, the sectors 14 will be arrested in their normal home positions wherein the zero printing characters 15 are presented to a print line substantially in line with the printing hammers.

When a register gear registers a value other than 0, a different portion of the flange 110 thereof will be presented to its stop lever 113. For example, if the gear registers an actual digital value between approximately 6 and 9.75, the high level 110H will be presented as indicated in FIG. 21, whereas if the gear registers a value between approximately .25 and 5, the low level 110L will be presented, while, if the gear registers between approximately 9.75 and .25, the intermediate level 110I will be presented.

As a further example, if two adjacent orders of the accumulator register the nominal value 09, the lower order register gear 76 will be set at 9 and the higher order gear 76 will be set at .9 due to the fractional tens carry transmitted from the lower order gear 76. This movement will be sufficient to move the intermediate level 110I of the higher order gear clockwise past the associated ear 112. Accordingly, the total stop levers will assume their positions shown in FIG. 24 when the frame 117 is rocked fully counterclockwise. When the wedges 130 are lowered, the wedge associated with these levers will cam counterclockwise idly along the surface 152 of the tine 115 on the lower order stop lever and also along the rear side 151 of the tine 116 of the higher order stop lever.

Prior to actuation of the printing sectors, the cam 124 will operate to retract the higher order to stop lever to the level of the intermediate portion 110I of its register gear 76. Accordingly, when the sectors are actuated, the lower order register gear 76 will be moved counterclockwise by its digitizing gear 75 through nine increments until its zero stop shoulder 111 arrests against its total stop lever. Likewise, the higher order register gear 76 will be moved counterclockwise through its associated digitizing gear and through the orbital movement of the higher order gear 84 by the bearing 161 associated with the lower order register gear 76. The higher order register gear 76 will be arrested first, causing the drive shoulder 69 on the associated sector to yield. At this point, stresses or loads are introduced in the higher order gears 75, 84 and 76 which tend to increase frictional drag or binding forces between such points as the interfaces between the higher order gear 84 and the eccentric bearing 161 of the lower order register gear 76. In the absence of the yieldable finger 163, such frictional drag could, because of inaccurately made parts or because of dirt lodged between the bearing surfaces, etc., become great enough to prevent the sector associated with the next lower order gear 75 from returning the lower order register gear 76 to zero position. That is, the shoulder 69 of such lower order sector might thus yield at that time and before the lower order register gear has returned to zero. For this reason, the finger 163 of the lower order register gear becomes effective to yield at such time, permitting the lower order register gear 76 to be safely returned to zero by the associated sector. Such frictional drag or binding forces occur only momentarily, when the drive shoulder 69 on the higher order sector is yielding or "breaking-out" from the bail rod 54. After such "break-out" of the shoulder 69, the binding forces disappear. During such "break-out" time the finger 163 of the next lower order register gear will yield and will normally return to its original condition after such "break-out." In this regard, it will be recalled that the fingers 163 are so constructed that they will safely yield before the respective detenting shoulders 69 yield.

Considering now an example where the value 99 is registered by two adjacent orders, the normal relative positions of the two register gears and their associated total stop levers prior to lowering of the wedges 130 is depicted in FIG. 23. Here, the lower order register gear presents its high level 110H to its total stop lever, but the higher order register gear which actually registers 9.9 will normally present its intermediate level 110I, although it may possibly present its high level 110H if inaccuracies are present in the entrained gears. If the condition shown in FIG. 23 prevails, subsequent lowering of the wedge 130 common to both stop levers will cause the same to cam along the surface 152 of the tine 115 of the lower order lever and thereby cam the higher order stop lever clockwise to position its ear 112 above the high level of its respective gear flange so that both gears may be driven subtractively through nine increments to zero. Any fractional carry into a next higher order register gear will be retracted during such operation.

In the next higher order, the total stop lever 113 will be raised by the action of cam 124 to an intermediate level so as to arrest its respective gear at zero.

Consider now an example where the value 009990 has been added into the accumulator and a totaling operation is to be performed. In such case, as depicted diagrammatically in FIG. 18, the flanges 110 of the various register gears 76 would be positioned as shown relative to their total stop levers 113. That is, the various register gears and their flanges 110 would actually register the underlined values indicated directly thereabove while the true or nominal registrations are indicated in parenthesis.

When the total stop levers 113 are allowed to sense the flanges 110, they will assume the relative positions (viewed in plan) shown at the lower left-hand corner of FIG. 18 relative to a reference line 155. That is, the units order stop lever 113 will engage the intermediate level of the associated flange 110. The tens order stop lever will engage the outer level of its associated flange 110. In the hundreds order, the register gear and its flange will register 9.9. Accordingly, the associated stop will normally be blocked in its intermediate position shown in full lines where it will rest on the intermediate level of the flange, or it may possibly be blocked in its outermost position shown in dotted lines if inaccuracies in the gear train were present. In the thousands order, the register gear 76 and its flange 110 will stand at 9.99 or substantially 0 and therefore, its total stop lever will assume substantially the same position that the zero stop lever in the units order assumes. In the ten thousands order, although no digitation has taken place, the gear will stand at .999 or practically 1 as the result solely of tens carry from the three lower orders. Thus, the total stop lever will drop to its lowermost position. The hundred thousands order, registering .09, will present its intermediate level to its stop lever.

It will be noted at this point that the sensing wedges 130 are unsymmetrically shaped, each having a camming surface 171 which extends at a greater angle from a radial line passing through its apex than the opposite camming surface 172. This construction enables each wedge as shown in FIG. 21, when cammed counterclockwise by an associated total stop lever 113, to cam the next higher order total stop lever a slightly greater extent (assuming both stop levers to be sensing similar levels) to compensate for any wear or tolerances in dimensions and yet ensure that the flange 110 associated with such higher order stop lever be properly positioned relative thereto. However, when a wedge is rocked clockwise as shown in FIG. 22, it will be ineffective, because of its peculiar shape, to hold the next higher order total stop lever outward beyond the position of the lower order total stop lever and will thus enable proper sensing of the discs.

Now, when the wedges 130 are lowered, as indicated in the diagrammatic plan view of FIG. 19, the units and tens order stop levers U and T, respectively, will be uneffected. The hundreds order stop lever H will be cammed back to its position illustrated if it is not already held thereby its respective gear flange. The thousands order stop lever T will be cammed back by the associated wedge 130 cooperating with the stop lever H since the relationship depicted in FIG. 23 will prevail. The ten thousands order stop lever TT, which at this time senses the lower level of its respective gear flange, is allowed to remain in contact therewith. Obviously, the hundred thousands lever HT will sense the intermediate level of its associated flange and will not be moved by the associated wedge. Now, at 75° the frame 117 will be partially retracted to raise the ten thousandths lever TT above the intermediate level 110I. Accordingly, the sectors will be permitted to advance to present the type characters 009990 to the print line.

Means are provided for retracting the printing sectors 14 a slight amount, i.e., approximately equal to one-fourth the circular pitch of the gear teeth on the sectors, and in a counterclockwise direction when the machine is at rest as well as during the early phases of a cycle and during the printing operation. Such retraction of the sectors enables any of the lowermost stop pins 12 representing zero to be set while permitting shifting of the pin carriage without the possibility of engagement with the shoulders 41 of the sectors. Also, such setting ensures that a maximum amount of tolerance in the accumulator parts may be accepted while ensuring reliable operation thereof, particularly during totaling and subtotaling operations.

For this purpose, an aligner 156 (FIGS. 1 and 3) is provided which extends along all of the printing sectors. The aligner is pivoted at 158 on a bail 160 which is fulcrumed on a stationary rod 161 and is normally held in a counterclockwise rocked position relative to the bail 160 by a tension spring 159. The bail 160 (see also FIG. 3) is connected through a pin slot connection 162 to a cam follower 163. The latter is fulcrumed on the shaft 114 and carries a stud 164 which is held by a tensioned spring 165 against the periphery of an aligner control cam 166 secured to the drive shaft 21.

When the aligner is rocked into engagement between two adjacent teeth on the sectors 14, the bail 160 continues to rock counterclockwise slightly effecting a toggle action which retracts the sectors slightly in a counterclockwise direction.

As shown at item 3 (FIG. 20), the aligner 156 is in engaged position when the machine is at rest and is held in position until approximately 75° in the cycle. Thus, during totaling and subtotaling operations wherein the total stop levers 113 are caused to cooperate with the register elements 76 of the accumulator, such elements are retracted slightly clockwise (see FIG. 22) so as to ensure that the proper levels of the register elements are presented to the respective stop levers 113 in spite of any inaccuracies in the accumulator parts. Just prior to the printing operation, the aligner is again moved into aligning position to align and advance the sectors to positions where they are held until after the printing operation and just prior to commencement of the sector return movement at 220°. Thus, the appropriate type characters are properly aligned with each other and with the hammers during printing.

It will be noted (FIGS. 1 and 10) that a ledge 127 on the plate 104 normally, i.e., when the pin carriage is in its home position, lies outside the paths of movement of lugs 125 on the levers 113, thus permitting the same to move into cooperative relation with the flanges 110. However, during digit entry operations, when the pin carriage is moved out of its home postion, the plate 124 is moved rearwardly, thereby positioning the ledge 127 under the lugs 125 to prevent movement of the levers 113 toward cooperative relation with the flanges 110.

Additional aligner lugs 128 extend from the levers 113 to align the digitizing gears 75 when the latter are out of mesh with the sectors 14, as shown in FIG. 1. However, when the accumulator is moved upward to mesh with the sectors, the gears 75 move out of engagement with the aligner lugs.

Although the invention is disclosed as embodied in an accumulator for receiving multi-denominational order entries, it should be understood that it can also be embodied in a counting type accumulator in which case only the digitizing gear in the lowermost denominational order is operated to effect count entries and all digitizing gears are operated during totaling and subtotaling operations.

Various features disclosed herein are disclosed and claimed in the following copending applications:

H. L. Clary et al., Serial No. 140,336, filed September 25, 1961.
B. F. Kuhne, Serial No. 140,544, filed September 25, 1961.
B. F. Kuhne, Serial No. 140,545, filed September 25, 1961.
K. F. Oldenburg et al., Serial No. 140,547, filed September 25, 1961.
K. F. Oldenburg et al., Serial No. 140,549, filed September 25, 1961.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a calculating machine having differential actuators and yieldable means for driving said actuators; an accumlator comprising denominationally arranged register elements, digitizing gears driven by said actuators, crawl tens transfer mechanism entrained with said gears and said register elements, spring means urging each of said register elements into a predetermined relation with a part of said transfer mechanism, said spring means being weaker than said yieldable means, and totaling stops effective to arrest said register elements in zero registering positions.

2. In a calculating machine having differential actuators, drive means, and self-releasable coupling means intermediate said drive means and said actuators, said coupling means being releasable as an incident to a predetermined loading of said actuators, an accumulator comprising denominationally arranged register elements, digitizing gears driven by said actuators, crawl tens transfer mechanism entrained with said gears and said register elements, yieldable means normally maintaining each of said register elements in predetermined relation with a part of said transfer mechanism, and totaling stops effective to arrest said register elements in zero registering positions, said yieldable means being effective to yield before release of said coupling means.

3. In a calculating machine having differential actuators and yieldable means for driving said actuators; an accumulator comprising denominationally arranged register elements, digitizing gears driven by said register elements, crawl tens transfer mechanism entrained with said gears and said register elements, a lost motion connection between each said register element and part of said transfer mechanism, yieldable means normally maintaining each of said register elements in a predetermined position relative to its said lost motion connection, and stop means effective to arrest said register elements in zero registering positions, said last mentioned yieldable means being effective to yield before yielding of said first mentioned yieldable means.

4. In a calculating machine having differential actuators, drive means, and self releasable coupling means intermediate said drive means and said actuators, said coupling means being releasable upon arresting of said actuators, an accumulator comprising denominationally arranged register elements, digitizing gears driven by said actuators, crawl tens transfer mechanism entrained with said gears and said register elements, a lost motion connection between each of said register elements and part of said transfer mechanism, spring means normally maintaining each of said register elements at one end of a respective said lost motion connection, and totaling stops effective to arrest said register elements in zero registering positions, said spring means being effective to yield before release of said coupling means.

5. In a calculating machine having differential actuators, drive means, a self releasable coupling means intermediate said drive means and said actuators, said coupling means being releasable upon arresting said actuators, an accumulator comprising denominationally arranged eccentric bearing members, means supporting said bearing members for rotation about a common axis, register gears supported by said bearing members for rotation about said axis, means forming a lost motion connection between each of said register gears and a respective one of said bearing members, spring means normally maintaining each of said register gears at one end of its said lost motion connection, gear members supported by said bearing members for rotation about axes eccentric to said first mentioned axis, said gear members each meshing with a said register gear and a said digitizing gear whereby to transmit digitizing movements and carry movements to said register gears, and totaling stop means effective to arrest said register gears in zero registering positions, said spring means being effective to yield before release of said coupling means.

References Cited in the file of this patent

UNITED STATES PATENTS

| | | |
|---|---|---|
| 1,828,180 | Gardner | Oct. 20, 1931 |
| 2,277,498 | Mehan | Mar. 24, 1942 |
| 2,278,863 | Chase | Apr. 7, 1942 |
| 2,456,101 | Yeasting | Dec. 14, 1948 |
| 2,832,531 | Chall | Apr. 29, 1958 |

FOREIGN PATENTS

| | | |
|---|---|---|
| 237,441 | Great Britain | of 1925 |